United States Patent Office 3,152,113
Patented Oct. 6, 1964

3,152,113
PYRIDINIUM SALTS OF HALOPYRIMIDINE DYESTUFFS
David Taber, Pittsburgh, Pa., assignor to American Aniline Products, Inc., a corporation of Maryland
No Drawing. Filed Dec. 18, 1961, Ser. No. 160,330
5 Claims. (Cl. 260—154)

This invention relates to new dyestuffs and to the coloration of cellulosic and other textile materials therewith. In one specific aspect, it relates to new water-soluble dyestuffs having attached thereto at least one pyridinium salt of 2,6- or 4,6-dihalopyrimidine.

In recent years there has been considerable interest in the manufacture of water-soluble dyestuffs containing triazine or pyrimidine rings to which there are attached reactive halogen atoms. These classes of dyestuffs are believed to react with the functional groups of cellulosic and other fibers and, as a result, give colorations which are extremely resistant to wet treatments. The dyestuffs must contain at least one ionogenic solubilizing group, e.g., sulfonic acid or carboxylic acid groups, to make them sufficiently water-soluble to be applied from an aqueous bath. The requirement for at least one sulfonic acid or carboxylic acid group thus imposes a limitation on the type of colored compound that can be used to synthesize the dyestuffs.

I have found that unexpectedly superior water-soluble dyestuffs can be made from water-insoluble dyestuffs, free of ionogenic solubilizing groups, by converting water-insoluble dyestuffs containing at least one 2,6- or 4,6-dihalopyrimidine group to the mono- or bis-pyridinium salt of the halopyrimidine. My new dyestuffs, when applied to cellulosic or other textiles, by dyeing or printing under neutral conditions or in the presence of an acid-binding agent, give bright colorations which have good wash fastness.

It is therefore an object of the present invention to provide a new class of water-insoluble dyestuffs solubilized by the presence of at least one pyridinium salt of a 2,6- or 4,6-dihalopyrimidine group.

In accordance with the invention, I have discovered dyestuffs of the formula:

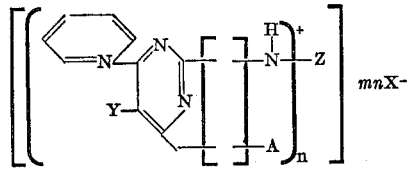

wherein Z is a water-insoluble colored moiety of the azo, anthraquinone, phthalocyanine or nitro series, as recognized by the Colour Index, 2nd Edition, 1956; A is a member selected from the group consisting of X and pyridinium; Y is a member selected from the group consisting of hydrogen, chlorine, bromine, nitro, lower alkyl and lower alkoxy; and X is chlorine or bromine. $m$ is an integer having a value of 1 or 2 depending on the value of A and $n$ is an integer having a value of 1–4. The Z term, representing the dyestuff moiety, is free of ionogenic solubilizing groups.

The new dyestuffs are made by the interaction of one mole of a water-insoluble primary amine of the azo, anthraquinone, phthalocyanine or nitro series with at least one mole of trichloro- or tribromopyrimidine per amino group to form a water-insoluble aminohalopyrimidine dyestuff intermediate. The 2,4,6-trihalopyrimidine can be substituted in the 5-position, as indicated hereabove, with a chlorine, bromine, nitro, lower alkyl or lower alkoxy group. The water-insoluble intermediate is converted to its water-soluble mono- or bis-pyridinium salt by reacting it with one or two moles of pyridine per pyrimidine group.

The water-insoluble primary amine colorants of the azo series suitable for making the dyestuffs of the invention can be made in a variety of ways. One method is to couple an arylamine, which is free of other groups convertible to amino groups, with either (1) an arylamino coupling component which accepts diazonium salts without modification, (2) an arylamine containing an amino group protected by a hydrolyzable group which can be converted to a free amine by hydrolysis, or (3) a coupling component containing a nitro group which can be reduced to an amino group after the coupling reaction.

Alternatively, arylamines containing nitro groups can be diazotized and coupled with (1) an arylamino coupling component which accepts diazonium salts without modification, (2) an arylamine containing an amino group protected by a hydrolyzable group, (3) a coupling component free of amino groups, or (4) a coupling component containing a nitro group which can be reduced to an amino group after the coupling reaction. The nitro groups are then reduced to amino groups to form colorants useful in the invention.

Still a further method involves diazotizing arylamines containing acylamino groups and coupling them with (1) an arylamino coupling component which accepts diazonium salts without modification, (2) an arylamine containing an amino group protected by a hydrolyzable group, (3) a coupling component free of amino groups, or (4) a coupling component containing a nitro group which can be reduced to an amino group after the coupling reaction. Hydrolysis of the acylamido group or groups gives the starting materials useful in the invention.

Water-insoluble amines, free of other groups convertible to amino groups, from which useful diazo compounds can be made include, but are not limited to, aniline,
o-, m-, and p-toluidine,
2,4- and 2,5-xylidine,
o-, m- and p-anisidine,
o-, m- and p-phenetidine,
o-, m- and p-chloroaniline,
o-, m- and p-bromoaniline,
o-, m- and p-fluoroaniline,
2,4- and 2,5-dichloroaniline,
trichloroaniline,
1-naphthylamine,
2-naphthylamine,
5-aminotetralin,
6-aminotetralin,
2-methyl-1-naphthylamine,
3-methyl-1-naphthylamine,
4-methyl-1-naphthylamine,
5-methyl-1-naphthylamine,
6-methyl-1-naphthylamine,
7-methyl-1-naphthylamine,
8-methyl-1-naphthylamine,
1-methyl-2-naphthylamine,
3-methyl-2-naphthylamine,
4-methyl-2-naphthylamine,
5-methyl-2-naphthylamine,
6-methyl-2-naphthylamine,
7-methyl-2-naphthylamine,
8-methyl-2-naphthylamine,
2-ethyl-1-naphthylamine,
4-ethyl-1-naphthylamine,
7-ethyl-1-naphthylamine,
2,3-dimethyl-1-naphthylamine,
2,6-dimethyl-1-naphthylamine,
1,7-dimethyl-2-naphthylamine,
1,4-dimethyl-2-naphthylamine, 3,6-dimethyl-2-naphthylamine,
4-phenyl-1-naphthylamine,
6-phenyl-1-naphthylamine,
7-phenyl-1-naphthylamine,
6-phenyl-2-naphthylamine,
2-chloro-1-naphthylamine,
3-chloro-1-naphthylamine,
4-chloro-1-naphthylamine,
5-chloro-1-naphthylamine,
6-chloro-1-naphthylamine,
7-chloro-1-naphthylamine,
8-chloro-1-naphthylamine,
1-chloro-2-naphthylamine,
3-chloro-2-naphthylamine,
4-chloro-2-naphthylamine,
5-chloro-2-naphthylamine,
$x$-halo-$y$-methyl-1-naphthylamine,
$x$-halo-$y$-methyl-2-naphthylamine,
$x,y$-dihalo-1-naphthylamine,
$x,y$-dihalo-2-naphthylamine,
1- or 2-aminoanthraquinone,
o-, m- and p-aminobenzanilide,
o-, m- and p-aminoacetanilide,
2- and 4-aminobiphenyl ether,
sulfanilamide,
metanilamide,
orthanilamide,
$N^1$-methylsulfanilamide,
$N^1,N^1$-dimethylsulfanilamide,
$N^1$-methylmetanilamide,
o-, m- and p-aminoacetophenones,
o-, m- and p-ethylaniline,
o-, m- and p-isopropylaniline,
dehydrothiotoluidine,
primuline base,
4-benzamido-2,5-diethoxyaniline,
pseudocumidine,
4-amino-4-nitroacetanilide,
4-amino-N-ethylacetanilide,
4-amino-2,5-dimethoxyacetanilide,
p-amino-N-butylbenzamide,
4-amino-5-chloro-o-benzanisidide,
3-chloro-o-toluidine,
3-bromo-o-toluidine,
4-bromo-o-toluidine,
4-chloro-o-toluidine,
2-chloro-m-toluidine,
4-chloro-m-toluidine,
2-bromo-m-toluidine,
4-bromo-m-toluidine,
2-bromo-p-toluidine,
3-bromo-p-toluidine,
2-chloro-p-toluidine,
3-chloro-p-toluidine,
5-methyl-o-anisidine,
2,5-dimethoxyaniline,
2,5-diethoxyaniline,
o-, m- and p-aminophenol,
2-, 3- or 4-aminobiphenyl,
5-amino-o-toluenesulfonanilide,
monobenzoyl-o-toluidine,
monobenzoylbenzidine,
N-phenyl-o-phenylenediamine,
4,4'-diaminodiphenylamine,
N,N-diethyl-p-phenylenediamine,
N,N-dimethyl-p-phenylenediamine and
N-ethyl-p-phenylenediamine.

Useful amines bearing nitro groups which can be diazotized and coupled as described hereabove include
o-, m- and p-nitroaniline,
3,4,5 and 6-nitro-o-toluidine,
2,4,5, and 6-nitro-m-toluidine,
2- and 3-nitro-p-toluidine,
3-chloro-2-nitroaniline,
3-chloro-2-nitroaniline,
5-chloro-2-nitroaniline,
6-chloro-2-nitroaniline,
2-chloro-3-nitroaniline,
4-chloro-3-nitroaniline,
5-chloro-3-nitroaniline,
6-chloro-3-nitroaniline,
2-chloro-4-nitroaniline,
3-chloro-4-nitroaniline,
2-chloro-6-bromo-4-nitroaniline,
2-amino-6-nitrobenzotrifluoride,
4-methylsulfonyl-2-nitroaniline,
2-methylsulfonyl-4-nitroaniline,
2-nitro-1-naphthylamine,
3-nitro-1-naphthylamine,
4-nitro-1-naphthylamine,
5-nitro-1-naphthylamine,
5-nitro-1-naphthylamine,
6-nitro-1-naphthylamine,
7-nitro-1-naphthylamine,
8-nitro-1-naphthylamine,
1-nitro-2-naphthylamine,
3-nitro-2-naphthylamine,
4-nitro-2-naphthylamine,
5-nitro-2-naphthylamine,
6-nitro-2-naphthylamine,
8-nitro-2-naphthylamine,
8-nitro-5-aminotetralin,
7-nitro-6-aminotetralin,
4-methyl-2-nitro-1-naphthylamine,
5-methyl-2-nitro-1-naphthylamine,
7-methyl-2-nitro-1-naphthylamine,
8-methyl-2-nitro-1-naphthylamine,
4-methyl-3-nitro-1-naphthylamine,
2-methyl-4-nitro-1-naphthylamine,
5-methyl-4-nitro-1-naphthylamine,
6-methyl-4-nitro-1-naphthylamine,
7-methyl-4-nitro-1-naphthylamine,
8-methyl-4-nitro-1-naphthylamine,
2-methyl-5-nitro-1-naphthylamine,
6-methyl-5-nitro-1-naphthylamine,
7-methyl-8-nitro-1-naphthylamine,
1-methyl-4-nitro-2-naphthylamine,
4,6-dimethyl-3-nitro-1-naphthylamine,
2,6-dimethyl-4-nitro-1-naphthylamine,
4-phenyl-2-nitro-1-naphthylamine,
3-chloro-2-nitro-1-naphthylamine,
3-bromo-2-nitro-1-naphthylamine,
4-chloro-2-nitro-1-naphthylamine,
4-bromo-2-nitro-1-naphthylamine,
5-bromo-2-nitro-1-naphthylamine,
4-chloro-3-nitro-1-naphthylamine,
4-bromo-3-nitro-1-naphthylamine,
2-chloro-4-nitro-1-naphthylamine,
4-bromo-4-nitro-1-naphthylamine,
8-chloro-4-nitro-1-naphthylamine,
1-chloro-5-nitro-2-naphthylamine,
1-chloro-6-nitro-2-naphthylamine,
1-chloro-8-nitro-2-naphthylamine,
2-bromo-5-nitro-2-naphthylamine,
4-bromo-6-nitro-2-naphthylamine,
4-bromo-8-nitro-1-naphthylamine,
3-bromo-1-nitro-2-naphthylamine,
6-bromo-1-nitro-2-naphthylamine,
6-bromo-1-nitro-2-naphthylamine,
1-bromo-4-nitro-2-naphthylamine,
1-bromo-5-nitro-2-naphthylamine,
1-bromo-6-nitro-2-naphthylamine,
2,4-dibromo-3-nitro-1-naphthylamine,
2,4-dibromo-5-nitro-1-naphthylamine,
2,4-dibromo-6-nitro-1-naphthylamine,
2,4-dibromo-8-nitro-1-naphthylamine,
2,4-dichloro-5-nitro-1-naphthylamine,
2,4-dichloro-6-nitro-1-naphthylamine and
4'-amino-4-nitrobenzanilide.

Among the suitable amines bearing acylamido groups that can be diazotized and coupled as described hereabove there are o-, m- and p-aminoacetanilide,
3-, 4-, 5- or 6-aminoacet-o-toluidide,
2-, 4-, 5- or 6-aminoacet-m-toluidide,
2- or 3-aminoacet-p-toluidide,
3-, 4-, 5- or 6-aminoacet-y-anisidides,
2-, 3-, 4-, 5- or 6-aminoacet-y-phenetidides, and
3-, 4-, 5- or 6-aminoacyl-y-anisidides.

Among the coupling components which can be coupled with the diazonium salts listed hereabove to form the amino azo compounds directly there are included, cresidine 1-naphthylamine,
2-naphthylamine,
2,5-xylidine,
m-toluidine,
2,5-dimethoxyaniline,
2,5-diethoxyaniline,
4-methyl-2,5-dimethoxyaniline,
3-methoxy-p-toluidine,
m-phenylenediamine,
nitro-m-phenylenediamine,
3'-amino-p-toluenesulfono-p-toluidide,
1-(m-aminophenyl)-3-methyl-5-pyrazolone,
1-(p-aminophenyl)-3-methyl-5-pyrazolone and
3-amino-p-acetotoluidide.

Those arylamines which contain an amino group protected by a hydrolyzable group which is converted to a free amino group after hydrolysis include o-anisidine-ω-methane sulfonic acid, 1-(p-acetamidophenyl)-3-methyl-5-pyrazolone and o-toluidine-ω-methane sulfonic acid.

Coupling components which do not contain an amino group and must therefore be coupled with either a diazonium salt bearing nitro groups or acylamido groups which can then be converted to free amino groups or, with a diazonium salt having attached thereto a 2,6- or 4,6-dihalopyrimidine group, include phenol,
o-, m-, and p-cresol,
o-, m-, and p-chlorophenol,
o-, m-, and p-bromophenol,
catechol,
resorcinol,
o-, m-, and p-methoxyphenol,
o-, m-, and p-ethoxyphenol,
o-, m-, and p-dimethylaminophenol,
1-naphthol,
2-naphthol,
6-hydroxytetralin,
5-hydroxytetralin,
6-ethyl-5-hydroxytetralin,
2,6-dimethyl-1-naphthol,
4,8-dimethyl-2-naphthol,
2-, 3-, 4-, 5-, 6-, 7- or 8-methyl-1-naphthol,
3-, 4-, 5-, 6-, 7- or 8-methyl-2-naphthol,
2-, 3-, 4-, 5-, 6-, 7- or 8-chloro-1-naphthol,
3-, 4-, 5-, 6-, 7- or 8-chloro-2-naphthol,
2-, 3-, 4-, 5-, 6-, 7- or 8-bromo-1-naphthol,
3-, 4-, 5-, 6-, 7- or 8-bromo-2-naphthol,
1-anthrol,
2-anthrol,
3-hydroxy-2-naphthamide,
N-methyl-3-hydroxy-2-naphthamide,
3-hydroxy-2-naphthanilide and those compounds of this series commonly known as the Naphthols (C.I. 37505 to C.I. 37580), 5-oxo-1-phenyl-2-pyrazoline-3-carboxamide,
ethyl-5-oxo-1-phenyl-2-pyrazoline-3-carboxylate,
1-(m-aminophenyl)-3-methyl-5-pyrazolone,
1-(p-aminophenyl)-3-methyl-5-pyrazolone,
1-(m-chlorophenyl)-3-methyl-5-pyrazolone,
3-methyl-5-pyrazolone,
3-methyl-1-phenyl-5-pyrazolone,
3-methyl-1-(p-nitrophenyl)-5-pyrazolone,
3-methyl-1-(p-chlorophenyl)-5-pyrazolone,
3-methyl-1-(m-sulfamylphenyl)-5-pyrazolone,
3-methyl-1-(m-nitrophenyl)-5-pyrazolone,
1-(m-nitrophenyl)-3-carboxy-5-pyrazolone,
acetoacetanilide,
o-acetoacetotoluidide,
2,4-acetoacetoxylidide,
o-acetoacetanisidide,
2,5-dimethoxyacetoacetanilide,
4-chloro-2,5-dimethoxyacetoacetanilide,
o-chloroacetanilide,
N,N-dimethylaniline,
N,N-diethylaniline,
N,N-di-N-propylaniline,
2-(N-ethylanilino)-ethanol,
3-N-ethylanilino-1,2-propandiol,
2-(N-butylanilino)-ethanol,
2,2'-(m-chlorophenylimino)-diethanol,
2-(m-tolylimino)diethanol,
3-(N-2-hydroxyethyl-m-toluidino)bispropionitrile,
1-sec-butyl-1,2,3,4-tetrahydro-7-methyl-3-quinolinol,
1,2,3,4-tetrahydrobenzo[h]-quinolin-3-ol,
2,4-quinolinediol, and
4-hydroxy-1-methylcarbostyril.

The above compounds containing hydroxyl groups should be coupled with a diazonium salt containing a dihalopyrimidine group in order to minimize side reactions. An example of a coupling component containing a nitro group which thereafter can be reduced is 3-methyl-1-(p-nitrophenyl)-5-pyrazolone.

The water-insoluble primary aminoazo colorants used in the invention also include those containing more than one azo group. Useful disazo compounds may be formed by the tetrazotization of an aromatic diamine containing two primary amino groups and coupling the tetrazo compound thus formed with two moles of one of the above-defined amino-bearing coupling components or with one mole of each of two of the above-defined amino-bearing coupling components and with one mole of the above-defined amino-bearing coupling components or one mole of a coupling component having no amino group. Suitable aromatic diamines include benzidine, 3,3'-dimethoxybenzidine, 3,3'-dichlorobenzidine, and 4,4'-diaminostilbene. Another method of forming the disazo or polyazo amines useful in the invention involves the use of the above-described processes with aromatic amines or diamines containing azo groups.

Starting materials for the new dyestuffs of the invention containing one or more azo groups can be obtained by an alternative process involving coupling a diazonium compound with a coupling component wherein either the diazonium compound or the coupling component, or both, has attached thereto at least one halopyrimidine group. In carrying out this alternative process, the coupling is generally effected at a temperature below about 5° C., conveniently at a temperature between 0 and 5° C., and at as low a pH as is efficient with coupling in order to minimize side reactions.

Useful amino anthraquinones include 1-amino-4-methylaminoanthraquinone,
1-amino-4-ethylaminoanthraquinone,
1-amino-4-anilinoanthraquinone,
1-amino-4-[(o-, m-, or p-)toluidino]anthraquinone,
1-amino-4-(2,4-xylididino)anthraquinone,
1-amino-4-[(o-, m-, or p-)anisidino]anthraquinone,
1-amino-4-[(o-, m-, or p-)phenetidino]anthraquinone,
1-amino-4-[(o-, m-, or p-)chloroanilino]anthraquinone,
1-amino-4-[(o-, m-, or p-)nitroanilino]anthraquinone,
1-amino-4-cyclohexylaminoanthraquinone,
1-amino-4-dimethylaminoanthraquinone,
1-amino-4-bis(2-hydroxyethyl)aminoanthraquinone,
1-amino-4-benzylaminoanthraquinone, 1-amino-4-(2-phenylethylamino)anthraquinone,
1-amino-4-(2-naphthylamino)anthraquinone,
1-amino-4-(1-naphthylamino)anthraquinone,
1-amino-4-(p-biphenylamino)anthraquinone,
1-amino-4-acetamidoanthraquinone,
1-amino-4-benzamidoanthraquinone,
1-amino-4-p-chlorobenzamidoanthraquinone,
1-amino-4-p-anisylamidoanthraquinone,
1-amino-4-p-trifluoromethylbenzamidoanthraquinone,
1-amino-4-p-trifluoromethylanilinoanthraquinone,
1-amino-4-p-cyanoanilinoanthraquinone,
1-amino-4-(1-tetrahydronaphthylamino)anthraquinone,
1-amino-4-(5-tetrahydronaphthylamino)anthraquinone,
1-amino-4-thiophenoxyanthraquinone,
1-amino-4-(p-thiocresoxy)anthraquinone,
1-amino-4-methoxyanthraquinone,
1-amino-4-phenoxyanthraquinone,
1-methoxy-4-(o-, m-, or p-aminoanilino)anthraquinone,
1-phenoxy-4-(o-, m-, or p-aminoanilino)anthraquinone,
1-amino-4-(o-, m-, or p-aminoanilino)anthraquinone,
1-methylamino-4-(o-, m-, or p-aminoanilino)-
   anthraquinone,
1-ethylamino-4-(o-, m-, or p-aminoanilino)anthraquinone,
1-anilino-4-(o-, m-, or p-aminoanilino)anthraquinone,
1-p-toluidino-4-(o-, m-, or p-aminoanilino)anthraquinone,
1-cyclohexylamino-4-(o-, m-, or p-aminoanilino)-
   anthraquinone,
1-p-toluidino-4-(o-, m-, or p-aminoanilino)anthraquinone,
1-p-anisidino-4-(o-, m-, or p-aminoanilino)anthraquinone,
1-(1-naphthylamino)-4-(o-, m-, or p-aminoanilino)-
   anthraquinone,
1-acetamido-4-(o-, m-, or p-aminoanilino)anthraquinone,
1-benzamido-4-(o-, m-, or p-aminoanilino)anthraquinone,
1-methoxy-4-(2-aminoethylamino)anthraquinone,
1-phenoxy-4-(2-aminoethylamino)anthraquinone,
1-amino-4-(2-aminoethylamino)anthraquinone,
1-methylamino-4-(2-aminoethylamino)anthraquinone,
1-ethylamino-4-(2-aminoethylamino)anthraquinone,
1-anilino-4-(2-aminoethylamino)anthraquinone,
1-p-toluidino-4-(2-aminoethylamino)anthraquinone,
1-cyclohexylamino-4-(2-aminoethylamino)anthraquinone,
1-p-toluidino-4-(2-aminoethylamino)anthraquinone,
1-p-anisidino-4-(2-aminoethylamino)anthraquinone,
1-(1-naphthylamino)-4-(2-aminoethylamino)-
   anthraquinone,
1-acetamido-4-(2-aminoethylamino)anthraquinone,
1-benzamido-4-(2-aminoethylamino)anthraquinone,
1-hydroxy-4-[p-(p-aminophenyl)anilino]anthraquinone,
1-methyl-4-[p-(p-aminophenyl)anilino]anthraquinone,
1-phenoxy-4-[p-(p-aminophenyl)anilino]anthraquinone,
1-amino-4-[p-(p-aminophenyl)anilino]anthraquinone,
1-methylamino-4-[p-(p-aminophenyl)anilino]-
   anthraquinone,
1-ethylamino-4-[p-(p-aminophenyl)anilino]-
   anthraquinone,
1-anilino-4-[p-(p-aminophenyl)anilino]anthraquinone,
1-p-toluidino-4-[p-(p-aminophenyl)anilino]-
   anthraquinone,
1-p-anisidino-4-[p-(p-aminophenyl)anilino)-
   anthraquinone,
1-(1-naphthylamino)-4-[p-(p-aminophenyl)anilino]-
   anthraquinone,
1-acetamido-4-[p-(p-aminophenyl)anilino]anthraquinone,
1-benzamido-4-[p-(p-aminophenyl)anilino]-
   anthraquinone,
1-methoxy-4-[p-(p-aminobenzyl)anilino]anthraquinone,
1-phenoxy-4-[p-(p-aminobenzyl)anilino]anthraquinone,
1-amino-4-[p-(p-aminobenzyl)anilino]anthraquinone,
1-methylamino-4-[p-(p-aminobenzyl)anilino]-
   anthraquinone,
1-ethylamino-4-[p-(p-aminobenzyl)anilino]-
   anthraquinone,
1-anilino-4-[p-(p-aminobenzyl)anilino]anthraquinone,
1-p-toluidino-4-[p-(p-aminobenzyl)anilino]-
   anthraquinone,
1-cyclohexylamino-4-[p-(p-aminobenzyl)anilino]-
   anthraquinone,
1-p-anisidino-4-[p-(p-aminobenzyl)anilino]-
   anthraquinone,
1-acetamido-4-[p-(p-aminobenzyl)anilino]-
   anthraquinone,
1-benzamido-4-[p-(p-aminobenzyl)anilino]-
   anthraquinone,
1-aminoanthraquinone,
2-aminoanthraquinone,
1,4-diaminoanthraquinone,
1,5-diaminoanthraquinone,
1,8-diaminoanthraquinone,
2,6-diaminoanthraquinone,
1-amino-2-bromoanthraquinone,
1-amino-2-chloroanthraquinone,
1-amino-2-methoxyanthraquinone,
1-amino-2-phenoxyanthraquinone,
1-amino-2-thiophenoxyanthraquinone,
4,4'-diamino-1,1'-dianthrimide,
2-amino-3-bromoanthraquinone,
2-amino-3-chloro-1-bromoanthraquinone,
1-amino-4-bromoanthraquinone,
1-amino-4-chloroanthraquinone,
1-amino-6-chloroanthraquinoone,
1-amino-7-chloroanthraquinone,
2-amino-1-chloroanthraquinone,
2-amino-3-chloroanthraquinone,
1-amino-2,4-dibromoanthraquinone,
1-amino-2,3-dibromoanthraquinone,
1-amino-2,3-dichloroanthraquinone,
1-amino-2-methylanthraquinone,
1,4-diamino-2,3-dichloroanthraquinone,
6-amino-3-methyl-7H-dibenz[f, i, j]isoquinoline-2,7-
   (3H)-dione,
6-(p-aminoanilino)-3-methyl-7H-dibenz-[f, i, j]-
   isoquinoline-2,7-(3H)-dione,
4-amino-1,9-anthrapyrimidine,
4-(p-aminoanilino)-1,9-anthrapyrimidine,
5-amino-1,9-anthrapyrimidine and
5-(p-aminoanilino)-1,9-anthrapyrimidine.

Colorants of the phthalocyanine series useful in making the dyestuffs of the invention are those free of ionogenic solubilizing groups which contain at least one amino group. The amino group may be attached directly to the benz-rings of the phthalocyanine nucleus or it may be attached through a divalent bridging radical. Useful amines of the phthalocyanine series include copper tetra-(4)-aminophthalocyanine, copper tri-(4)-aminophthalocyanine, copper di-(4)-aminophthalocyanine, copper mono-(4)-aminophthalocyanine, cobalt tetra-(4)-aminophthalocyanine, nickel tetra-(4)-aminophthalocyanine, and metal free tetra-(4)-aminophthalocyanine. Examples of divalent bridging radicals include -phenylene-, —CO-phenylene-, —SO$_2$-phenylene-, —NH-phenylene-, —S-phenylene-, —CH$_2$O-phenylene-, —CH$_2$-phenylene -, — SCH$_2$ - phenylene -, — SO$_2$CH$_2$ - phenylene -, — SO$_2$NR - phenylene - CH$_2$ —, — SO$_2$NR - arylene -, —NRCO-phenylene-, NRSO$_2$-phenylene, —SO$_2$O-phenylene-, —CH$_2$—, —CH$_2$NR-phenylene-, —CH$_2$NHCO-phenylene-, —SO$_2$NR-alkylene-, —CH$_2$NR-alkylene-, — CONR - phenylene - CH$_2$ —, — CONR - arylene -, —SO$_2$— and —CO—. In the above divalent bridging radicals, R stands for hydrogen, alkyl or cycloalkyl.

The aminophthalocyanines which contain the divalent bridging radicals referred to hereabove can be made by heating together nitro or acylamido derivatives of phthalic acid, phthalic anhydride or phthalic acid imide and the corresponding substituted phthalic acids, anhydrides and imides, by conventional methods, e.g., by heating together a mixture of the appropriate phthalic acid derivative or derivatives, urea, cupric chloride and ammonium molybdate in o-dichlorobenzene at about 150° C. Phthalocyanine cannot be nitrated directly and amino phthalic acids, anhydrides or imides cannot be converted into the corresponding amino phthalocyanine.

Useful colorants of the nitro series include the substituted derivatives of diphenylamines and phenylnaphthylamines, such as N-(2,4-dinitrophenyl)-p-phenylenediamine and N-(2,4,6-trinitrophenyl) benzidine. These derivatives are conveniently made by condensing an arylamine containing a hydrolyzable group such as acylamido, with an arylhalide containing a nitro group in the o- or p-positions; e.g., 2,4-dinitrochlorobenzene, then hydrolyzing the product to the free arylamine.

In preparing the dyestuffs of the invention, the desired primary amine of the azo, anthraquinone, phthalocyanine or nitro series is reacted with at least one mole of 2,4,6-trihalopyrimidine per amino group, as shown hereunder, to form the aminohalopyrimidine intermediate. Substitution occurs in either the 2- or 4-position.

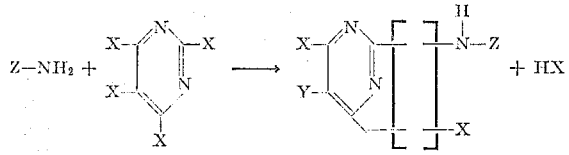

In the above equation X, Y and Z have the values given aforesaid. Conveniently, the reaction is accomplished by dissolving one mole of amine and one mole of 2,4,6-trihalopyrimidine (per free amino group) in a polar solvent, preferably a 50-50 mixture of alcohol and water. The reaction mixture is stirred and heated to a moderately elevated temperature of about 55-65° C. As the reaction progresses the mixture becomes increasingly acidic, because of the formation of halogen acid from the condensation. It is therefore desirable to neutralize the reaction mixture as the reaction progresses by adding thereto the theoretical requirement of an acid-binding agent, such as sodium carbonate. On completing the reaction, the product aminohalopyrimidine precipitates from the solution and is easily recovered by filtration.

The mono- or bispyridinium salt of the halopyrimidine is formed according to the following equation:

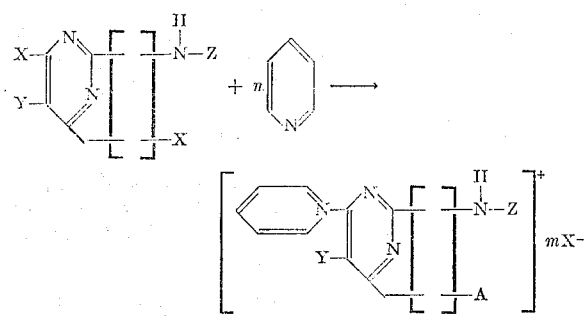

In the above equation A, X, Y, Z and $m$ have the values given aforesaid. The reaction is conducted at a temperature between about 60° C. and the boiling point of the reaction medium, which can be an excess of pyridine or a suitable inert solvent, such as dioxane or lower alkanol. Upon cooling the product dyestuff precipitates from the reaction mixture and is recovered by filtration. The dyestuff thus obtained is oven dried and is thereafter ready for use.

The new dyestuffs of the invention are especially suited for the coloration of cellulosic textile materials such as cotton, linen and viscose rayon, although they also may be effectively applied to silk, wool, nylon and the like.

The dyestuffs are applied by treating the textile material in an aqueous solution (which may be a thickened printing paste) of the dyestuff in substantially neutral solution or in the presence of an acid-binding agent, for example, sodium hydroxide, sodium phosphate or sodium carbonate. The acid-binding agent may be added to the dye bath either prior to, simultaneously with, or after the addition of the dyestuff.

The dyestuff solution may contain commonly used dye bath adjuvants such as sodium chloride, sodium sulfate, sodium alginate, urea or water-soluble alkyl ethers of cellulose.

The printing paste may contain commonly used adjuvants such as urea, and thickening agents, e.g., methyl cellulose, starch and locust bean gum and sodium alginate.

Dyeing in the presence of the acid-binding agent is preferably carried out at elevated temperatures, for example, at temperatures between 60° and the boiling point of the dyestuff solution in order to improve the exhaustion and fixation of the dyestuff.

The textile material printed with printing paste containing an acid-binding agent is preferably steamed or heated in order to fix the dyestuff on the textile material.

When the acid-binding agent is applied to the textile material before or after the dyestuff, it is preferably applied by treating the fiber with an aqueous solution of the acid-binding agent, i.e., a padding technique. The aqueous solutions of acid-binding agents may also contain the common dye bath adjuvants.

Both the solution of acid-binding agent and dyestuff may be applied at room temperature or at elevated temperatures. The textile material can be dried between the two treatments if desired. It is preferred to heat or steam cellulosic material at an elevated temperature, for example, at 100° C. or higher, for a short period of time after application of the dyestuff and acid-binding agent to fix the dyestuff on the textile material by linking the dye to the fiber.

The above techniques may be modified by substituting for the acid-binding agent a substance, which on heating or steaming, generates an acid-binding agent. Such substances include alkali metal bicarbonates which on steaming yield alkali metal carbonates.

The fastness to washing or subsequent wet processing of the colorations produced using my new dyestuffs is improved by a scouring treatment, e.g., applying a hot aqueous solution of soap and sodium carbonate followed by rinsing in hot water prior to drying.

The new dyestuffs may also be applied to silk, wool, regenerated protein, nylon and modified polyacrylonitrile textile materials by using the conventional dyeing methods for those textile materials; i.e., dyeing from weakly acid dye bath solutions, for example, dyestuff solutions containing acetic acid or ammonium sulfate at a temperature above 80° C. When dyeing proteinaceous fibers in conjunction with an acidic agent, it is preferable to use a temperature between 80-100° C.

My invention is further illustrated by the following examples:

*Example I*

A solution of 18.3 g. (0.10 mole) of 2,4,6-trichloropyrimidine in 450 ml. of 95% alcohol is charged to a 2 l. 3-necked flask equipped with a dropping funnel, thermometer, and agitator. To this is added 19.7 g. (0.10 mole) of p-aminoazobenzene and 500 ml. of water. The mixture is stirred until the solid has dissolved and the temperature is raised to 60° C. during one hour. After two hours of stirring at this temperature, the pH is 1.00. The charge is cooled to 25° C. and the pH is adjusted to 6.2 by the dropwise addition of 32 ml. of a solution of 5.3 g. (0.050 mole) of sodium carbonate in 53 ml. of water. The mixture is heated to 50° C. and stirred for one and one-half hours at 58-62° C. After cooling to 25° C. the balance of the sodium carbonate solution is added and the mixture is stirred for one hour at 23° C. The precipitated dye is filtered off, washed with a mixture of 90 ml. of 95% ethanol and 100 ml. of water, and then with water until the washings are free of chloride ion. The product is dried over phosphorus pentoxide, whereupon there is obtained 31.7 g. (0.092 mole, 92%) of 2-(4'-phenylazonilido)-4,6-dichloropyrimidine, M.P.

198–200° C. *Analysis.*—Calcd. for $C_{16}H_{11}N_5Cl_2$ (344.2): Cl, 20.6. Found: Cl, 19.1.

A mixture of 6.88 g. (0.020 mole) of this product and 103 ml. of pyridine (dried over potassium hydroxide) is added to a 250 ml. 3-necked flask fitted with an agitator and a reflux condenser protected by a drying tube. The mixture is heated to refluxing (112–113° C.) in an oil bath (maximum temperature, 125° C.) during one hour and twenty-two minutes, and held for one hour. The pyridinium salt begins to separate at about 82° C. At the end of the reaction time a sample of the mixture is completely soluble in warm water. After cooling to 15° C. the solid is collected, washed with 100 ml. of pyridine and then with 250 ml. of ether. The yellow product is dried at 50° C. under vacuum. There is obtained 9.5 g. (0.018 mole, 95%) of the dipyridinium salt. *Analysis.*—Calcd. for $C_{26}H_{21}I.N_7Cl_2$: Cl, 14.1. Found: Cl, 13.2.

Example II

A 1% solution of the dye is made by dissolving the dye in water buffered to pH 7.0 and adding 25 g. of sodium chloride per 100 g. of water. A strip of 80 x 80 print cloth is padded with the solution, then steamed for 60 seconds without an intermediate drying. A second piece of cloth padded similarly is dried, then held for three minutes at 150° C. in an oven. In both cases very good wash fastness is obtained after rinsing and brief soaping.

Example III

A mixture of 206 ml. of dry pyridine and 13.7 g. of the disazo dye obtained by tetrazotizing benzidine and coupling it into aniline-ω-methane sulfonic acid followed by hydrolysis, then condensing the diamino compound so obtained with two molecular proportions of 2,4,6-trichloropyrimidine according to the procedure of Example I, is held at 112° C. for two hours. After cooling to 15° C. the solid is filtered off, washed with 150 ml. of pyridine, then with 300 ml. of ether, and dried at 50° C. under vacuum. There is obtained 18.4 g. (92% yield) of water-soluble orange dye.

Example IV

The procedure of Example II is followed using a 1% solution of the dye of Example III. The fastness of the dyeing to soaping is once again much greater than that of the colorant from which the dyestuff is prepared.

Example V

The procedure of Example III is repeated using as a dyestuff the product p-nitroaniline→N,N-dimethylaniline followed by reduction of the nitro group. There is obtained in good yield a reddish-orange dye.

Example VI

The procedure of Example III is repeated using as a dyestuff the product p-nitroaniline→xylidine (C.I. 11240). There is obtained in good yield a bright yellowish-orange dye.

Example VII

The procedure of Example III is repeated using as a dyestuff the product p-nitroaniline→1-naphthylamine (C.I. 11365). There is obtained in good yield a red dye.

Example VIII

The procedure of Example III is repeated using as a dyestuff the product p-acetoamide→1-naphthylamine. There is obtained in good yield a scarlet dye.

Example IX

The procedure of Example III is repeated using as a dyestuff the product 3,3′-diaminobenzanilide→1-(m-nitrophenyl)-3-methyl-5-pyrazolone (2 moles) followed by reduction of the nitro groups. There is obtained in good yield a yellow dye.

Example X

A mixture of 100 ml. of dry pyridine and 7.4 g. (0.020 mole) of the product obtained by reacting 2,4,6-trichloropyrimidine with 1-amino-2-methylanthraquinone according to the procedure of Example I, is held at 112° C. for one and one-half hours. After cooling to 15° C. the precipitated solid is filtered off, washed with 100 ml. of pyridine, then with 200 ml. of ether. After drying at 50° C. under vacuum, there is obtained 10.2 g. (96% yield) of orange colored product.

Example XI

The procedure of Example II is followed using a 1% solution of the dye of Example X. The fastness of the dyeing to soaping is once again much greater than that of the colorant from which the dyestuff is prepared.

Example XII

A mixture of 200 ml. of dry pyridine and 10.6 g. of the product obtained by condensing 1,4-diaminoanthraquinone with two molecular proportions of 2,4,6-trichloropyrimidine according to the procedure of Example I, is refluxed for two hours. After cooling to 12° C. the product is filtered off, washed with pyridine and with ether, and dried at 50° C. under vacuum. There is obtained 15.4 g. (91% yield) of bluish-red dye.

Example XIII

The procedure of Example II is followed using a 1% solution of the dye of Example XII. The fastness of the dyeing to soaping is once again much greater than that of the colorant from which the dyestuff is prepared.

Example XIV

The procedure of Example XII is repeated using an equivalent amount of 1-amino-4-anilinoanthraquinone as a starting material. There is obtained in good yield a violet dye.

Example XV

The procedure of Example XII is repeated using an equivalent amount of 1-amino-4-hydroxyanthraquinone as a starting material. There is obtained in good yield a red dye.

Example XVI

The procedure of Example XII is repeated using 1-methylamino-4-(p-aminoanilino)anthraquinone as a starting material. There is obtained in good yield a blue dye.

Example XVII

The procedure of Example XII is repeated using 1,8-diaminochrysazine as a starting material. There is obtained in good yield a violet dye.

Example XVIII

The procedure of Example XII is repeated using 1-amino-4-cyclohexylamino-2-methoxyanthraquinone as a starting material. There is obtained in good yield a violet dye.

Example XIX

The procedure of Example XII is repeated using 1,1′-iminobis(4-aminoanthraquinone) as a starting material. There is obtained in good yield a grayish blue dye.

Example XX

Two-hundredths of a mole of the condensation product of copper tetra(4)aminophthalocyanine with four molecular proportions of 2,4,6-trichloropyrimidine, according to the process of Example I, is refluxed for four hours with 300 ml. of dry pyridine. After cooling to 10° C. the precipitated product is filtered off, washed with pyridine, then with ether, and dried at 50° C. under vacuum to give an excellent yield of water-soluble blue dye.

*Example XXI*

The procedure of Example II is followed using a 1% solution of the dye of Example XX. The fastness of the dyeing to soaping is once again much greater than that of the colorant from which the new dyestuff is prepared.

*Example XXII*

A mixture of 100 ml. of dry pyridine and 10.8 g. (0.020 mole) of the product obtained by condensing N-(2,4,6-trinitrophenylbenzidine) with 2,4,6-trichloropyrimidine according to the procedure of Example I, is refluxed for one and one-half hours. After cooling to 15° C., filtering off the solid, washing it with pyridine and ether, and drying at 50° C. under vacuum, there is obtained 12.6 g. (90% yield) of water-soluble orange dye.

*Example XXIII*

The procedure of Example II is followed using a 1% solution of the dye of Example XXII. The fastness of the dying to soaping is once again much greater than that of the colorant from which the new dyestuff is prepared.

I claim:
1. A dyestuff of the formula:

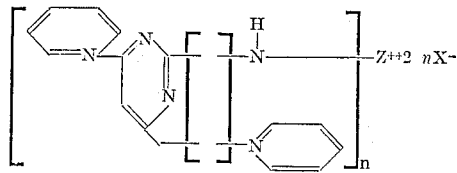

wherein Z is a water-insoluble dyestuff moiety selected from the group consisting of azo, anthraquinone, phthalocyanine and nitro dyestuffs, X is a member selected from the group consisting of chlorine and bromine, and $n$ is an integer having a value of 1–4.

2. A dyestuff of claim 1 wherein Z is an azo dyestuff moiety, X is chlorine, and $n$ is 1.

3. A dyestuff of claim 1 wherein Z is an anthraquinone dyestuff moiety, X is chlorine, and $n$ is 2.

4. A dyestuff of claim 1 wherein Z is a phthalocyanine dyestuff moiety, X is chlorine, and $n$ is 4.

5. A dyestuff of claim 1 wherein Z is a nitro dyestuff moiety, X is chlorine, and $n$ is 1.

No references cited.